United States Patent [19]

Ress

[11] Patent Number: 4,588,863
[45] Date of Patent: May 13, 1986

[54] SYSTEM FOR FACILITATING PROFESSIONAL TELEPHONE COMMUNICATION

[76] Inventor: James M. Ress, 5300 27th St., North, Arlington, Va. 22207

[21] Appl. No.: 629,801

[22] Filed: Jul. 11, 1984

[51] Int. Cl.$^4$ .............................................. H04M 1/274
[52] U.S. Cl. ............................. 179/90 BD; 179/90 B
[58] Field of Search .......... 179/90 B, 90 BB, 90 BD, 179/2 EA

[56] References Cited

U.S. PATENT DOCUMENTS

| | | | |
|---|---|---|---|
| 4,029,908 | 6/1977 | Moseley et al. | 179/90 BB |
| 4,090,037 | 5/1978 | Benjamin et al. | 179/90 AN |
| 4,186,279 | 1/1980 | Face | 179/90 B |
| 4,266,102 | 5/1981 | Stanley et al. | 179/90 CS |
| 4,277,651 | 7/1981 | Fisher et al. | 179/90 B |
| 4,283,603 | 8/1981 | Cerbone | 179/18 FA |
| 4,453,042 | 6/1984 | Wolf et al. | 179/84 VF |
| 4,475,013 | 10/1984 | Lee et al. | 179/90 BD |

Primary Examiner—Gene Z. Rubinson
Assistant Examiner—Robert G. Lev
Attorney, Agent, or Firm—Drummond & Nissle

[57] ABSTRACT

Improved telephone apparatus. Circuitry in the apparatus includes a memory unit. Telephone numbers can be dialed into the memory unit while an individual is conversing over the telephone. After the individual completes his conversation, the circuitry automatically electronically dials one of the telephone numbers stored in the memory unit.

1 Claim, 3 Drawing Figures

SYSTEM FOR FACILITATING PROFESSIONAL TELEPHONE COMMUNICATION

This invention relates to telecommunication apparatus.

More particularly, the invention relates to telephone communication apparatus which permits an individual, while conversing over a telephone, to sequentially enter a series of telephone numbers into a memory unit in the telephone by depressing the dialing buttons on the telephone, and which, after the individual concludes his conversation, automatically electronically dials one of the telephone numbers entered in the memory unit.

In another respect, the invention pertains to telecommunication apparatus of the type described which is unitary, is portable, and can be utilized by simply plugging the apparatus into a 115 volt electrical outlet and connecting an existing telephone line to a conventional modular jack mounted in the apparatus.

In a further respect, the invention pertains to telecommunication apparatus which increases the number of individuals a telephone salesman can contact during a work shift by up to twenty-five percent.

Telemarketing in an expanding, world-wide business which accounts for the sale of a wide variety of products. In 1980 the United States alone accounted for more than $50,000,000,000 in telemarketing expenditures. The size of a telemarketing business can vary from one or two salespersons and telephones to an office which includes more than three hundred salesmen. The equipment utilized by telemarketing personnel must be compact and mobile because the location and layout of a telemarketing office often continually changes. Consequently, telemarketing firms normally do not employ large, expensive computers because the cost of constantly relocating such equipment would be prohibitive.

The primary objective of a telephone salesman is, during the time he is working, to dial as many telephone numbers and contact as many potential customers as possible. The greater the number of customer "contacts" achieved by a salesman, the greater the number of sales consummated by the salesman. Consequently, in telemarketing the time during which a salesman is not speaking to a potential customer is considered wasted time. The time wasted by a salesman during his work shift consists of three components. The first component consists of the time which passes from hanging up a call until dialing the next call; the second component consists of the time required to dial the next call; and, the third component consists of the time required for telephone company switching equipment to process the dialed number and cause a customer's phone to begin ringing. There is, unless the telephone company redesigns its switching equipment, no practical way to reduce the third component of the time wasted during a salesman's work shift.

At the beginning of his shift a salesman is fresh and usually promptly dials a new telephone number once he has completed a call. As the shift wears on, the salesman tires and finds reasons to not promptly dial another number after he has completed a call. The salesman may light a cigarette, make notes, stand and stretch, etc. Such diversions, most of which could be accomplished after the salesman dials his next call, can markedly reduce the number of contacts the salesman achieves during his shift.

Accordingly, it would be highly desirable to provide improved telecommunication apparatus which would completely eliminate the time which elapses from when a salesman completes a call to when he begins to dial the next call and which would also minimize the time required to actually dial a call.

It would also be highly desirable to provide improved telecommunication apparatus of the type described which was compact, portable and could be readily, quickly and conveniently installed by persons of limited mechanical skill.

Therefore, it is a principal object of the invention to provide improved telecommunication apparatus.

Another object of the invention is to provide improved telephone apparatus which, in comparison to the number of contacts a telephone solicitor can consummate while utilizing conventional telephone equipment, increases by up to twenty-five percent the number of contacts the solicitor can make over a period of time.

A further object of the invention is to provide improved unitary telephone apparatus which permits a telephone solicitor to dial telephone numbers into a computer memory unit in a telephone while speaking to a potential customer over the telephone, and, which automatically electronically dials a number from the computer memory when the solicitor ends his conversation with the customer.

Still another object of the invention is to provide improved telemarketing apparatus which is compact, mobile and can be readily installed by individuals of limited mechanical skill.

These and other, further and more specific objects and advantages of the invention will be apparent to those skilled in the art from the following detailed description thereof, taken in conjunction with the drawings, in which.

Briefly, in accordance with my invention, I provide improved telecommunication apparatus for use in combination with an existing telephone line. The apparatus includes means for connecting the apparatus to the existing telephone line; means for receiving the voice of a first individual utilizing the apparatus and for transmitting the voice over the telephone line; a speaker for broadcasting the voice of a second individual, the voice of the second individual being carried to the telephone apparatus by the telephone line; memory means for storing a telephone number; dialing means for entering telephone numbers in the telephone apparatus, the telephone numbers entered on the dialing means normally being transmitted by the apparatus through the telephone line; and, means for causing a telephone number entered on the dialing means to be directed to and stored in the memory means when the first individual is utilizing the speaker and receiving means to communicate with the second individual over the telephone line, and, for, when the individuals have completed their conversation, automatically electronically dialing over the telephone line a telephone number stored in the memory means.

Figure 1A:
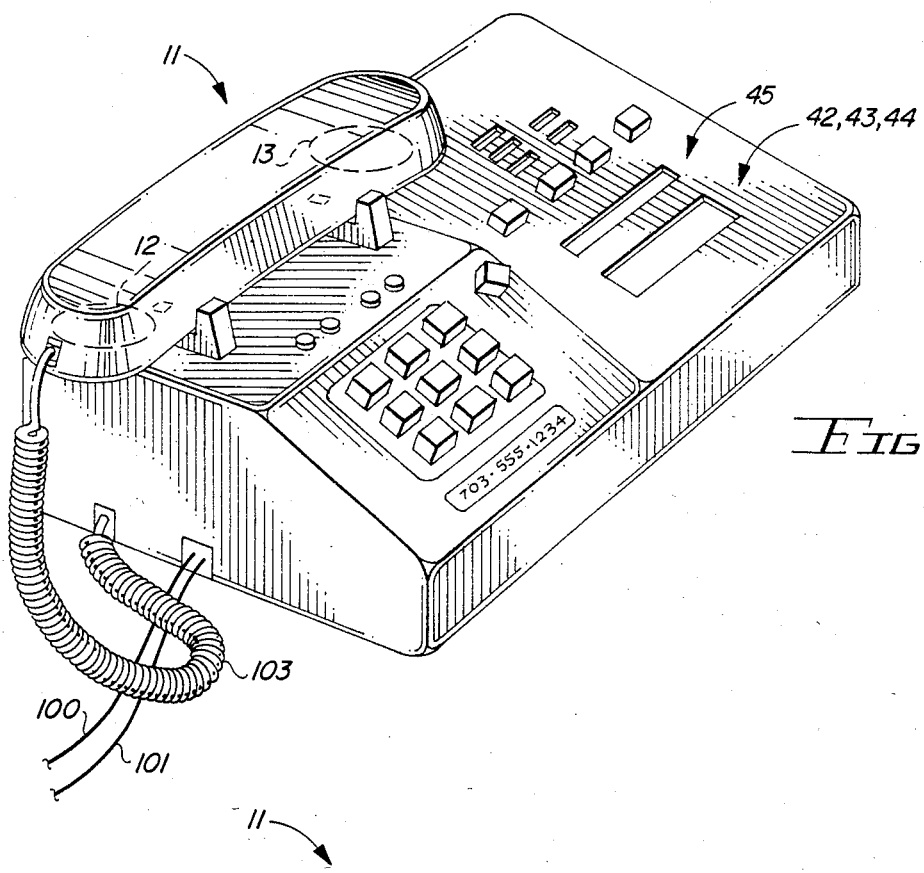
FIG. 1 is a perspective view of telephone apparatus constructed in accordance with the principles of the invention.
Figure 1B:
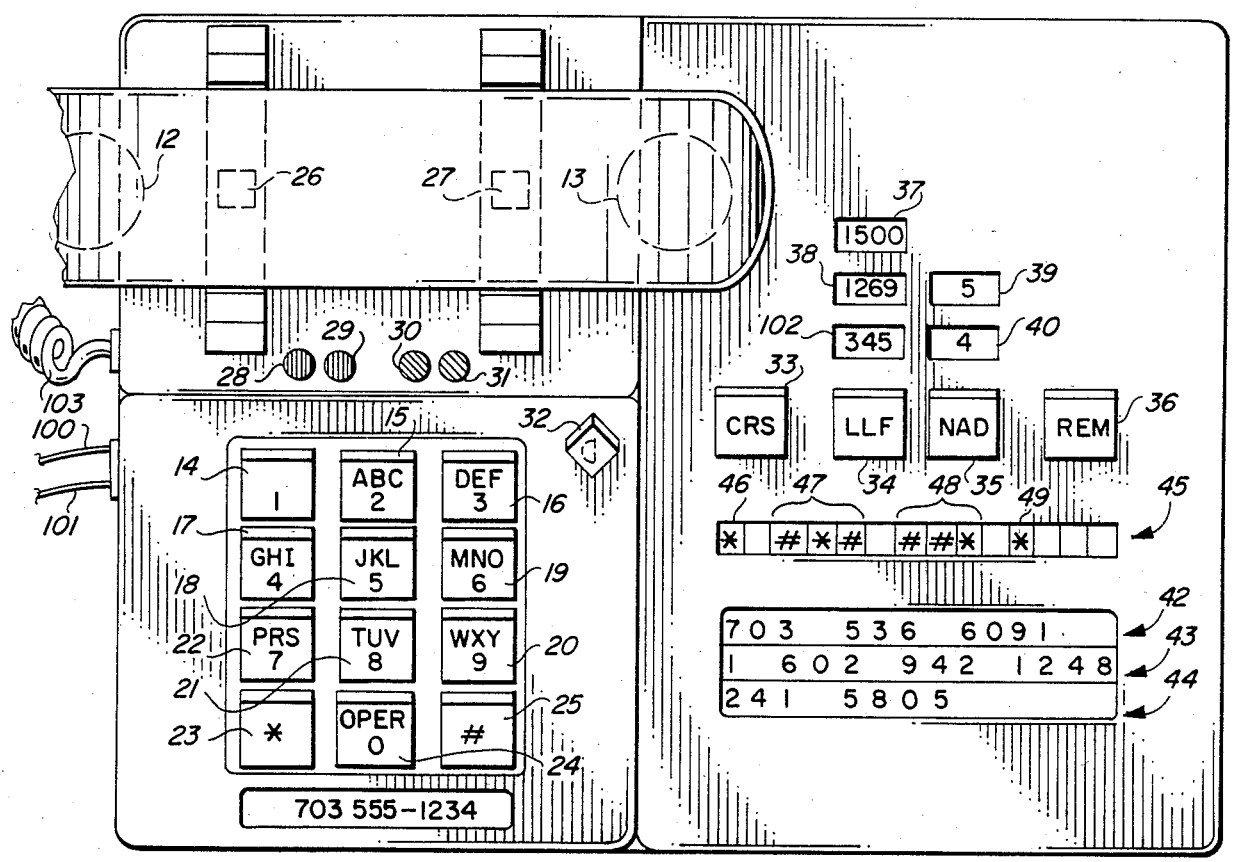

Turning now to the drawings, which depict the presently preferred embodiments of the invention for the purpose of illustrating the practice thereof and not by way of limitation of the scope of the invention, and in which identical reference characters represent corresponding elements throughout the several views, FIG. 1 illustrates telephone apparatus constructed in accordance with the invention and including push buttons 14–25 and handset 11 having a speaker 13 mounted in one end and a receiver 12 mounted in the other end. A telemarketing solicitor, termed the "user" in the trade, utilizing the apparatus of FIG. 1 holds handset 11 adjacent his head so he can speak into receiver 12 and listen via speaker 13 to the voice of a customer, termed the "caller" in the trade, with whom the user is conversing. When handset 11 is removed from the cradle of the apparatus of FIG. 1, buttons 26, 27 rise and a dial tone can be heard emanating from speaker 13. Push buttons 14–22, 24 are depressed in conventional manner to dial a telephone number after handset 11 has been lifted from the cradle of the telephone apparatus. Whether a telephone number dialed on buttons 14–22, 24 is transmitted through the telephone line or is entered into a memory unit in the apparatus depends, as will be explained, on the status of the apparatus circuitry. The free end (not shown) of cable 101 is adapted to be plugged into a conventional 115 volt wall outlet. Cable 101 provides power for the apparatus circuitry.

Red indicator lights 28, 29 and green indicator lights 30, 31 are mounted in the apparatus as is the constant-momentary disconnect knob 32. Only one of lights 28-31 illuminates at any given time. The left hand bulbs 28, 30 light first. When bulb 28 burns out bulb 29 will light in its place. When bulb 30 burns out bulb 31 will light in its place.

The apparatus of FIG. 1 includes four jacks (not visible), two for handsets and two for headsets. In FIG. 1 cord 103 of handset 11 is connected to one of the handset jacks. When constant-momentary disconnect knob 32 is turned to the left with handset 11 removed from its cradle, handset 11 is activated for use. The other handset jack and two headset jacks are also energized when knob 32 is turned to the left. If knob 32 is turned to the left and handset 11 is in the cradle, the apparatus of FIG. 1 is electronically "on-hook", i.e., electronically assumes handset 11 is in the cradle with dial tone buttons 26, 27 depressed.

When knob 32 is turned to the right a handset connected to one of the headset jacks is activated and can be utilized. The other headset jack and two handset jacks are also energized when knob 32 is turned to the right. If knob 32 is turned to the right and handset 11 is in the cradle, the apparatus is electronically "offhook" and directs a dial tone to the headset being utilized; i.e., the apparatus electronically views the headset as a handset 11 which has been lifted from the cradle to permit buttons 26, 27 to rise so that a dial tone emanates through the handset (headset).

The apparatus of FIG. 1 can be constructed such that if button 32 is depressed, when it is either turned to the left with handset 11 lifted from the cradle or is turned to the right, the user is temporarily disconnected from line 100, and, the circuitry automatically electronically selects the next number available in circuitry memory and dials the numbers over line 100. The user, in order to hear and converse with the next caller, has to release button 32 to permit it to move back to its normal "up" position.

Push buttons 33-36 illuminate when depressed. Push buttons 33-36 remain in a pushed down position when depressed and are released to the up position when again depressed. LLF and NAD screens 38, 40 display numbers currently programmed into the circuitry while screens 37, 39 display preset limit numbers. As will be described, CRS button 33 is utilized when the apparatus of FIG. 1 is connected to a central recording system; LLF button 34 is utilized to program a "load limit figure" into the circuitry of the apparatus of FIG. 1; NAD button 35 is utilized to program a "no answer disconnect" in the circuitry; and, REM button 36 is utilized to remove a number from circuitry memory.

The telephone number monitor screen 41 includes LED readout lines 42-44. Line 42 displays the telephone number utilized in the prior completed call; line 43 displays the telephone number of the call currently in process; and, line 44 displays the telephone number which will be automatically dialed by apparatus circuitry when the user completes his current call. After the user completes his call to 602 942 1248, the circuitry of the apparatus of FIG. 1 moves this number from line 43 to LED readout line 42 and moves the number displayed on readout line 44 up to readout line 43. When the number on line 44 is moved up to line 43, a new telephone number appears on line 44. The new number appearing at line 44 originates from circuitry memory. The new number was entered in computer memory by utilizing a procedure later described herein.

Codes are entered in the apparatus of FIG. 1 by dialing appropriate push buttons 14, 23, 25. LED screen 45 contains fourteen spaces and shows the codes dialed in the apparatus. A code dialed into the apparatus of FIG. 1 remains displayed on screen 45 for fifteen seconds after it is entered by depressing buttons 14, 23, 25. The first code dialed into the apparatus appears at the left hand end of screen 45. If a second code is entered while the first code is still displayed on screen 45, the first code is indexed to the right along screen 45 and the second code appears at the left hand end of screen 45. The first code is indexed far enough to the right so that there is a blank space between the first and second codes. If during a fifteen second period codes requiring more than fourteen allotted spaces on screen 45 are entered, codes at the right side of screen 45 index off of screen 45 to provide space for the more recent codes being entered at the left side of screen 45. For example, in FIG. 1 code 49 would index off the screen if new code "###" were entered in the apparatus.

When handset 11 is lifted from the cradle of the apparatus of FIG. 1, each of push buttons 14-25 illuminate. When a push button 14-22, 24 is depressed, the button light goes out until the button is released.

Figure 2:
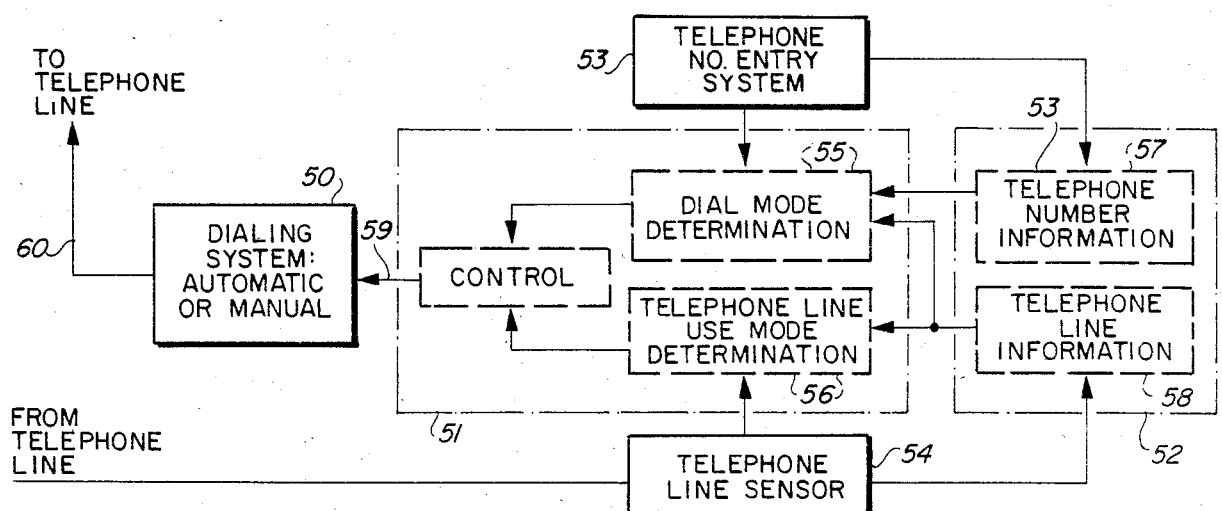
FIG. 2 is a block diagram illustrating a telecommunication system embodying the present invention.

FIG. 2 is a block diagram which illustrates a preferred embodiment of the telephone apparatus of the present invention, the main components of which are a dialing system 50, a dialing system controller 51 and a memory 52. A telephone number entry system 53 and telephone line sensor system 54 are provided. As indicated by the dashed lines, the controller 51 performs the dual function of dial mode determination 55 and telephone line mode determination 56. Memory 52 contains telephone number information 57 and telephone line information 58 which is initially furnished by the telephone number entry system 53 and the telephone line sensor system 54, respectively. After one or more telephone numbers are entered into telephone number memory 57 with system 53 and after the status of the telephone line is determined by sensor 54 and such information directed into the telephone line information memory 58, this information is fed to controller 51, which generates control signals 59 which are fed to the dialing system 50 and direct the dialing system to either automatically electronically dial a telephone number stored in memory 53 or which direct the dialing system 50 to only permit a number to be manually dialed with the telephone number entry system 53. Numbers which are automatically electronically dialed or are manually dialed by system 50 are transmitted 60 to the telephone line 100 attached to the apparatus.

The telephone number entry system 53 can be any suitable system for entering telephone numbers into the system circuitry. It is anticipated system 53 would normally comprise a conventional twelve button dialing system of the type illustrated in FIG. 1 herein.

The memory 52 can be any suitable prior art memory unit such as are commonly used in telecommunication or other types of communication systems. For example, electromagnetic memories such as magnetic, optical, solid state, etc. or mechanical memories such as paper tape can be utilized. The telephone number information 57 stored in memory 52 can consist of seven digit local telephone numbers, of ten digit long distance telephone numbers, or of numbers having any appropriate number of digits which will be received and processed by telephone company switching equipment.

The telephone line information provided by sensor 54 presently is intended to indicate whether the line is being used by a solicitor to converse with a customer; whether a number is being dialed on the line; whether the number has been dialed and is ringing on the line or has received a busy signal; and, whether, after a call has been completed, the user or caller has "hung up" and disconnected the line. Any appropriate electronic or mechanical sensor can be utilized in system 54 to monitor and direct telephone line status information into memory 58.

Figure 3:
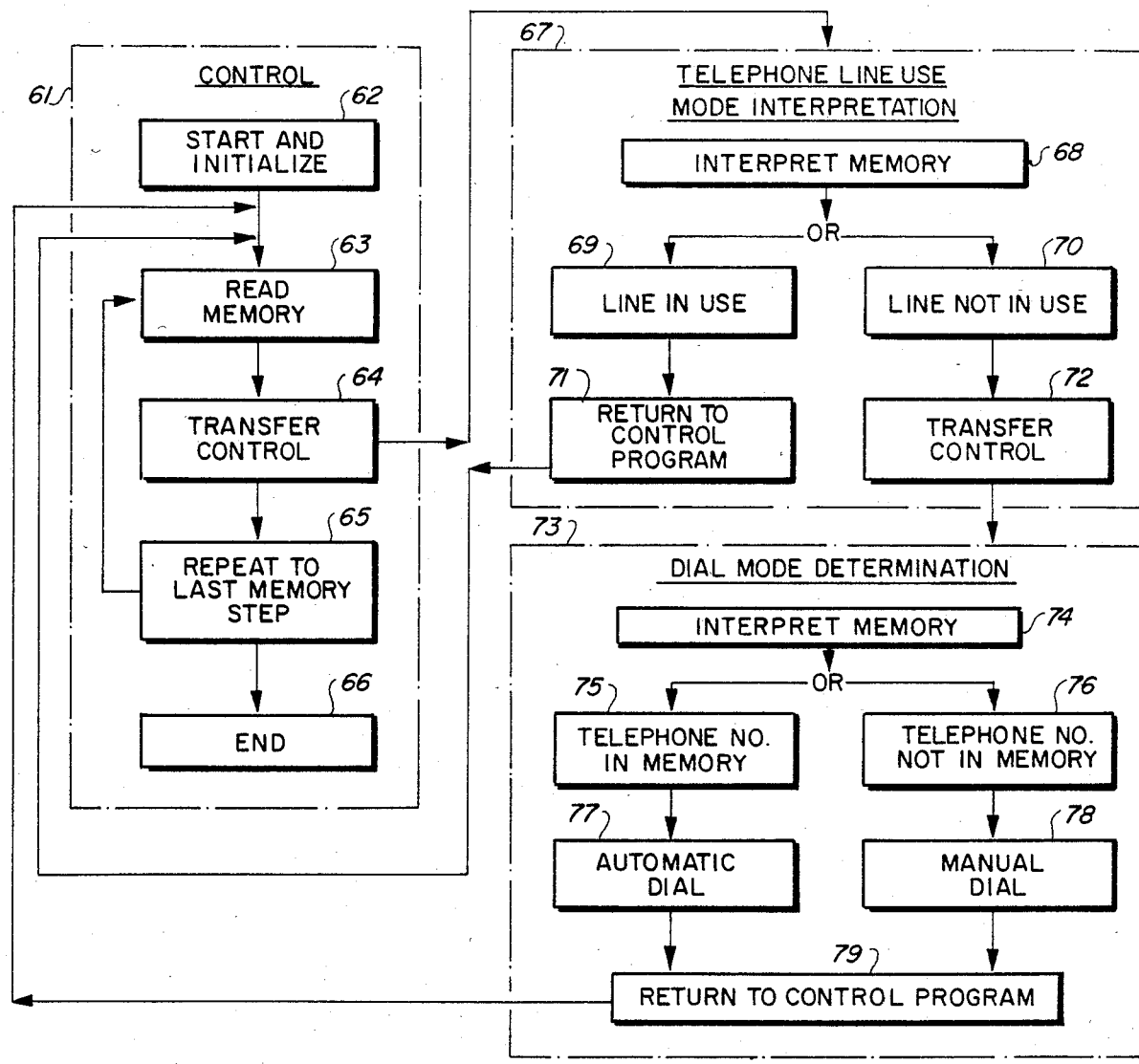
FIG. 3 is a block diagram which illustrates a typical program or logic function utilized in accordance with the presently preferred embodiment of the invention.

FIG. 3 is a block flow diagram which illustrates a typical program or logic function which is executed by the controller 51 in determining how telephone numbers entered through system 53 into memory 52 should be dialed into the telephone line 100 connected to the apparatus of FIG. 2. The basic control program 61 consists of commands to "start and initialize" 62, "read memory" 63 and "transfer control" 64 to the telephone line use mode determination sub-routine 67.

The telephone use mode determination 67 consists of commands to "interpret memory" 68 to determine if the telephone line is "in use" 69 or "not in use" 70. "Line in use" 69 is followed by "return to control program" 71. "Line not in use" 70 is followed by "transfer control" 72 to dial mode determination sub-routine 73.

The dial mode determination sub-routine 73 consists of commands to "interpret memory" 74 to determine if telephone numbers are stored "in memory" 75 or are "not in memory" 76. When telephone numbers are "in memory" 75 then when a solicitor completes a conversation with a customer a number stored in memory 52 is automatically electronically dialed 77. If telephone numbers are not stored in memory 76, then a number will be transmitted from the apparatus of FIG. 1 through the telephone line 100 attached thereto only when the number is manually dialed 78 on the twelve button key board shown in FIG. 1. The commands "automatic dial" 77 and "manual dial" 78 are followed by "return to control program" 79. The control program 61, telephone line use mode determination sub-routine 67 and dial mode determination sub-routine 73 are repeated as indicated by the "repeat to last memory step" 65 of the control program 61 followed by an "end" program step 66 which completes execution of the program.

It is anticipated that the telephone line use mode determination sub-routine 67 will determine telephone line 100 is "not in use" 70 when the solicitor depresses cradle dial tone buttons 26, 27 or knob 32 at the conclusion of a call, when the customer hangs up, when a call rings a selected number of times without being answered and is automatically disconnected by the circuitry, or, when the circuitry automatically disconnects a call after receiving a busy signal or recorded answer. Programming could be provided which would enable sensor 54 and sub-routine 73 to electronically determine that telephone line 100 was "not in use" 70 when the solicitor repeated a particular code word into receiver 12.

The apparatus of FIG. 1 can be utilized to perform the various procedures summarized below in Table I and on the following pages.

TABLE I

Summary of Dialing Procedures and Codes

| Procedure No. | Code | Description of Procedure |
| --- | --- | --- |
| 1 | * | Activating the Circuitry |
| *2 | #*# | Connecting to Central Recording System |
| #3 | #*## | Disconnecting from Central Recording System |
| 4 | LLF Button | Programming Load Limit Figure |
| 5 | *#*# | Cancellation of Load Limit Figure |
| 6 | NAD Button | Programming for No Answer Disconnect |
| 7 | **# | Cancellation of No Answer Disconnect |
| 8 | * | Entering Phone Numbers into Circuitry Memory for Immediate Use |
| 9 | *** | Entering Phone Numbers into Circuitry Memory for Later Use |
| 10A | *## | Entering Single Redial Number for Immediate Ringing |
| 10B | *##* | Entering a Single Redial Number for Later Ringing |
| 11A | * | Canceling a Phone Number Being Dialed |
| 11B | 1# | Canceling a Phone Number After It Is Dialed |
| 12 | REM Button | Removal of Number from Circuitry Memory |
| 13 | ## | Placing All Numbers Remaining in Circuitry Memory on Temporary Hold |
| 14 | * | Reactivating Circuitry from Temporary Hold Mode |
| 15 | ## | Temporarily Deactivating the Circuitry Memory on Temporary Hold |
| 16 | * | Reactivating Circuitry After Apparatus Placed in Conventional Use Mode by Procedure 15 |
| 17 | #** | Retaining Numbers in Circuitry Memory Over an Extended Period of Time |
| 18 | #**# | Reactivating Circuitry After Circuitry Memory Placed on Extended Hold by Procedure 17 |
| 19 | ##1**1## | Removing All Numbers and Codes from Circuitry Memory |
| 20 | ### | Canceling a Code Entered by Error |
| 21A | ##* | Entering Caller Disconnect Feature |
| 21B | ##*# | Canceling Caller Disconnect Feature of Procedure 21A |
| 22A | #* | Temporarily Interrupting Programmed Dialing Cycle to Enter Number(s) for Immediate Use |
| 22B | *# | Returning Circuitry to Regular Programmed Automatic Dialing Cycle |

TABLE I-continued

Summary of Dialing Procedures and Codes

| Procedure No. | Code | Description of Procedure |
|---|---|---|
| | | After Temporary Interruption Caused by Procedure 22A |
| 23A | ** | Entering Repeating Area Code |
| 23B | *#* | Canceling Repeating Area Code |

* Code is entered after button 33 is depressed.
Code is entered after button 33 is released.

1. Procedure 1: Activating the Circuitry. When the user removes handset 11 from the cradle and positions speaker 13 near his ear, the user hears a conventional dial tone. The user depresses button 23 to activate the circuitry of the invention. After button 23 is depressed light 30 illuminates and the conventional dial tone is discontinued.

2. Procedure 2: Connecting to Central Recording System. The circuitry contained in the apparatus of FIG. 1 can be electronically connected to a selected central recording system by depressing CRS button 33 and dialing #*#, i.e., by sequentially depressing button 25, button 23 and button 25. When the apparatus of FIG. 1 is connected to a central recording system it is anticipated that all telephone numbers and all code numbers entered by utilizing push buttons 14–25 will be recorded by the central recording system until the apparatus circuitry is disconnected from the central recording system by utilizing Procedure 3.

3. Procedure 3: Disconnecting from Central Recording System. To disconnect the apparatus circuitry from a central recording system the user depresses and releases CRS button 33 and dials #*##.

4. Procedure 4: Programming Load Limit Figure. If the user wishes to limit the number of telephone numbers, or the "load", which can be stored in the memory of the apparatus of FIG. 1, he depresses LLF button 34 and dials appropriate buttons 14–22, 24 to enter a load limit number into circuitry memory. The load limit number is displayed on screen 37 and can include up to four digits. By way of example, buttons 14, 18, 24, 24 would be sequentially depressed if it were desired to limit to 1500 the number of telephone numbers which can be stored in the circuitry memory of the apparatus. After a load limit figure is dialed into circuitry memory button 34 is again depressed and released. If desired, the user can, after entering a load limit figure, immediately begin entering numbers in circuitry memory by utilizing Procedure 8.

Screen 38 displays a cumulative total of all numbers dialed into a completely erased or "clear" circuitry memory after button 23 is depressed. Screen 38 continues to cumulatively total all numbers entered into circuitry memory until Procedure 19 is utilized to erase circuitry memory. After Procedure 19 is utilized, screen 38 is reset to zero and again begins to cumulatively total all numbers entered into circuitry memory. Screen 102 shows the cumulative total of calls transmitted through telephone line 100 after button 23 is depressed to activate the circuitry of the invention when circuitry memory is clear. Screen 102 continues to cumulatively total calls until Procedure 19 is utilized to erase circuitry memory. After Procedure 19 is utilized, screen 102 is reset to zero and again begins to cumulatively total calls transmitted through telephone line 100. Screens 38 and 102 display cumulative totals regardless of whether a load limit figure is currently displayed on screen 37.

5. Procedure 5: Cancellation of Load Limit Figure. If the user wished to cancel a load limit figure entered by Procedure 4, he depresses *#*#. To enter a new load limit figure the user repeats Procedure 4.

6. Procedure 6: Programming for No Answer Disconnect. This procedure permits the user to program the number of times a phone will ring before it is automatically disconnected and another telephone number is automatically electronically dialed by the apparatus circuitry of the apparatus of FIG. 1. The user programs the desired disconnect time in the apparatus circuitry by first depressing NAD button 35 and then depressing appropriate buttons 14–20, 24 to designate the number of times a phone number will ring before being disconnected by the circuitry. The number entered is displayed on screen 39. After a figure is dialed button 35 is again depressed and released. Screen 40 displays how often the caller's telephone has rung for the call currently in process. For example, in FIG. 1 the circuitry has been programmed to disconnect a telephone call after the caller's telephone has rung five times (screen 39), and, the caller's telephone has rung four times for the call in process (screen 40).

7. Procedure 7: Cancellation of No Answer Disconnect. If the user wishes to cancel an automatic disconnect number entered in circuitry memory by utilizing Procedure 6, he dials #. After code # is dialed the number on screen 39 disappears and a telephone number subsequently dialed by the circuitry will continue to ring until the user manually disconnects the line by depressing buttons 26, 27 or button 32.

8. Procedure 8: Entering Phone Numbers Into Circuitry Memory for Immediate Use. To enter telephone numbers into circuitry memory or immediate use the user depresses the * button 23 and dials in the desired telephone numbers. After the * button 23 is depressed light 30 illuminates. If light 30 is already illuminated button 23 need not again be depressed. Light 30 switches off while each telephone number is being dialed and illuminates after the entire number has been dialed. If light 30 does not illuminate after a telephone number has been dialed, the circuitry memory did not accept the number and the user must again depress * button 23 to illuminate light 30 and then redial the telephone number. If light 30 does not illuminate after the user depresses * button 23 and attempts to enter a telephone number, the user has seven seconds to depress * button 23 to illuminate green light 30. If the user fails to again depress * button 23 within seven seconds, light 28 flashes two times and continuously illuminates. The user must then depress * button 23 to illuminate green light 30 and turn off red light 28 and must again attempt to enter the correct telephone number.

If the user accidentally dials the same number twice, light 28 flashes three times to indicate that circuitry memory did not accept the duplicate entry. Green light 30 illuminates automatically after red light 28 flashes three times so that the user can promptly dial a number different than the number just rejected by circuitry memory.

If the user dials in a non-existent area code or a number not having the proper number of digits, light 28 flashes twice and then is continuously illuminated. The user must then depress * button 23 to turn off light 28 and turn on light 30 and must again attempt to dial a telephone number into circuitry memory.

The user can utilize Procedure 8 to enter telephone numbers into circuitry memory while conversing with a caller over handset 11, while a dialed call is ringing or producing a busy signal, while handset 11 is in the cradle, and while handset is removed from the cradle and, in general, whenever light 30 is illuminated.

9. Procedure 9: Entering Phone Numbers Into Memory for Later Use. If the user wishes to enter telephone numbers in circuitry memory for later recall he depresses *, listens for a dial tone, and dials telephone numbers into the circuitry memory by depressing appropriate buttons 14–22, 24. After the desired telephone numbers are entered in circuitry memory the user dials # to retain the number in memory for later recall. When the user wishes to recall the numbers from memory and to have the circuitry automatically electronically sequentially dial the numbers, he dials ##. After buttons 25, 23, 23, 25 are dialed the circuitry automatically dials a first number and subsequently automatically dials a new number from circuitry memory each time the user completes a telephone call. If a call is in process when ## is dialed, the circuitry waits for the call to be completed and then automatically electronically dials the first number.

10. Procedure 10A: Entering Single Redial Number for Immediate Ringing. This procedure enables the user to dial a telephone number a second time. To dial a telephone number a second time the user dials *## and redials the number. As soon as the number is dialed the number is automatically electronically transmitted through line 100 by the apparatus circuitry. If the call is not answered or receives a busy signal, the user dials 1# to disconnect the call and remove the number from circuitry memory. Code *## can be dialed at any time. If code *## is dialed while the circuitry is automatically dialing another number from memory or while the user is conversing with a caller, the circuitry will permit the call in process to be completed and will then automatically dial the number entered after code *## was dialed. After the call to the code *## number is completed, the circuitry again continues to automatically dial a number from circuitry memory each time the user completes a call.

11. Procedure 10B: Entering a Single Redial Number for Later Recall. The user dials *##* and dials the number he wants stored in circuitry memory for later recall. When the user wishes to recall the number he dials ##. When code ## is dialed, the circuitry automatically dials the stored number. If a call is in process when #**# is dialed, the circuitry waits for the call to be completed and then automatically electronically dials the stored number. To disconnect the call and remove the stored number from memory, the user dials 1#.

12. Procedure 11A: Canceling a Telephone Number Being Dialed. If the user wishes to cancel a telephone number before he has dialed the complete number, he dials *. After the * button is dialed light 30 illuminates and the user can enter another number.

13. Procedure 11B: Canceling a Telephone Number After It Is Dialed. If the user dials a complete telephone number before he discovers the number is incorrect, he dials 1# to erase the number just dialed from circuitry memory. After the user dials 1#, light 30 turns off, light 28 flashes twice, and light 30 illuminates. The double flash of light 28 confirms the number has been cancelled. After light 30 illuminates the user can dial another number.

14. Procedure 12: Removal of Telephone Number From Circuitry Memory. To remove one or more previously entered telephone numbers from circuitry memory, the user depresses REM button 36 and dials the numbers he wishes removed from memory. When REM button 36 is depressed light 30 is illuminated. Green light 30 switches off while a number is being dialed and illuminates after the number has been completely dialed. If the user accidentally dials a number which is not in circuitry memory, light 28 flashes twice and then continuously lights. The user then dials * button 23 which switches off light 28 and turns on light 30; when light 30 switches on the user again attempts to dial the number he wishes removed from circuitry memory. When the user has removed the desired telephone numbers from circuitry memory he depresses and releases REM button 36.

When REM button 36 is released, light 30 switches off and light 28 flashes twice. Light 30 then illuminates and the circuitry again begins to automatically dial a number from circuitry memory each time the circuitry determines line 100 is not in use.

15. Procedure 13: Placing All Numbers and Codes Remaining in Circuitry Memory on Temporary Hold. The Circuitry of the apparatus of FIG. 1 can, by dialing ##, be prevented from continuing to automatically dial a new number from memory each time the user completes a conversation with a caller. Code ## can be dialed while the user is conversing with a customer, while a call is being dialed, or while a call is ringing or receiving a busy signal. Light 28 flashes twice after code ## is dialed.

16. Procedure 14: Reactivating Circuitry From Temporary Hold Mode. Dialing * takes the circuitry off of the temporary hold command entered by utilizing Procedure 13. After * is dialed light 30 flashes twice and illuminates, and the circuitry automatically electronically dials one of the telephone numbers in circuitry memory and continues to automatically dial a new telephone number each time the user completes a call. The user can, if desired, dial additional numbers into circuitry memory.

17. Procedure 15: Temporarily Deactivating the Circuitry to Restore the Apparatus to Conventional Use. The automatic dialing circuitry of the telephone apparatus of FIG. 1 can, by dialing ##, be deactivated so the apparatus can be utilized like an ordinary telephone. Light 28 flashes twice after code ## is dialed. Existing codes and telephone numbers remain in circuitry memory after code ## is dialed. Code ## can be dialed while the user is still conversing with a customer or while a dialed number is being processed by the circuitry. If ## is dialed while the user is conversing with a customer or is listening to another number ring or to a busy signal, the circuitry permits the call in process to be completed, and then deactivates the automatic calling feature of the circuitry so that the apparatus can be utilized like a conventional telephone.

18. Procedure 16: Reactivating the Circuitry After the Apparatus Is Temporarily Placed in Conventional Use Mode by Procedure 15. When, after utilizing Procedure 15, the user is ready to reactivate the automatic dialing circuitry, he dials *. After code * is dialed light 30 flashes twice and illuminates and the circuitry automatically electronically dials a telephone number stored in the circuitry memory and continues to dial a new number each time the user completes a telephone call.

The user can, if desired, dial additional numbers into circuitry memory.

19. Procedure 17: Retaining Numbers and Codes in Circuitry Memory Over an Extended Period of Time. If at the end of a work period the user wishes to leave numbers in circuitry memory he dials #. Light 28 flashes thrice after code # is dialed. Dialing # will stop the circuitry from automatically ringing any new numbers and will cause all numbers previously entered in circuitry memory to remain in memory for an extended period of time. After # is dialed, the apparatus of FIG. 1 can be utilized in the manner of a conventional telephone; handset 11 can be removed from the cradle and numbers manually dialed by depressing push buttons 14–20, 24. Code # can be dialed while the user is conversing with a customer. If # is dialed while the user is speaking to a customer, the circuitry permits the user to complete the call and then prevents any further calls from being automatically placed.

20. Procedure 18: Reactivating Circuitry After Placing Circuitry Memory on Extended Hold by Utilizing Procedure 17. Reactivating the circuitry after it has been placed on extended hold by utilizing Procedure 17 is accomplished by dialing ##. After code ## is dialed light 30 flashes thrice and illuminates, and the circuitry causes one of the numbers retained in circuitry memory to be automatically electronically dialed, and, causes another number in the memory to be automatically dialed each time the user completes a call. The user can, if desired, dial additional numbers into circuitry memory.

21. Procedure 19: Removing All Numbers and Codes from Circuitry Memory. Any number and codes contained in the circuitry can at any time be completely and permanently erased from memory by dialing ##11##. After ##11## is dialed, the circuitry waits two minutes before it erases memory. If ##11## is dialed while the user is conversing with a customer, the circuitry permits the call to be completed and then, after the two minute grace period, after ##11## is dialed, circuitry memory can be reprogrammed by utilizing Procedure 8 or other appropriate procedures.

22. Procedure 20: Canceling a Code Entered in Error. Promptly dialing ### after entering a code cancels the code. After ### is dialed light 28 flashes twice and light 30 illuminates.

23. Procedure 21A: Entering Caller Disconnect Feature. When code ##* is dialed, the circuitry automatically electronically dials a new telephone number each time it senses that a customer with whom the user is conversing hangs up his (the customer's) telephone. After ##* is dialed light 30 flashes twice and illuminates.

24. Procedure 21B: Canceling Caller Disconnect Feature of Procedure 21A. Dialing ##*# cancels the caller disconnect feature entered by utilizing Procedure 21A. Light 28 flashes twice and light 30 illuminates after ##*# is dialed. When the caller disconnect feature is cancelled by dialing ##*#, the circuitry automatically dials another number only after the user has completed his call and has momentarily manually depressed buttons 26, 27, or button 32 after the circuitry detects a busy signal, or, after a caller's phone has rung a selected number of times.

25. Procedure 22A: Temporarily Interrupting Programmed Dialing Cycle to Enter Number(s) for Immediate Use. The user can, by dialing #*, interrupt the automatic sequential dialing by the circuitry of numbers entered in circuitry memory. After code #* is dialed, the user dials in telephone numbers he wants the circuitry to immediately sequentially transmit over line 100. After #* is dialed, light 28 flashes twice and light 30 illuminates. Code #* can be dialed and numbers entered while the user is conversing with a customer or while a dialed number is ringing or is otherwise in process.

26. Procedure 22B: Returning Circuitry To Regular Programmed Automatic Dialing Cycle After Temporary Interruption Caused by Procedure 22B. After the circuitry automatically sequentially dials over line 100 the numbers dialed after code #* is entered, the user dials *# to command the circuitry to resume the automatic sequential dialing of the numbers originally entered in circuitry memory. After *# is dialed light 30 flashes twice and illuminates.

27. Procedure 23A: Entering Repeating Area Code. This procedure causes the circuitry to automatically dial a particular area code for each seven digit number dialed into the circuitry. The procedure is advantageous when the user has a series of long distance telephone numbers to call which each have the same area code. A repeating area code is entered in the circuitry by dialing code  and then dialing the desired three digit area code. Light 30 illuminates when  is dialed and goes out when the area code is being dialed. After the area code is dialed light 30 flashes twice and illuminates. After the desired area code is entered in the circuitry in the manner described and light 30 flashes twice and illuminates, the user can dial the first seven digit telephone number having the area code entered by utilizing Procedure 23A. Light 30 goes out while the seven digit number is dialed and illuminates on completion of dialing of the number. After the seven digit number is entered, the circuitry electronically dials the area code entered by Procedure 23A and then dials the seven digit number. The circuitry will continue to automatically enter and electronically dial the area code for each seven digit number dialed into the circuitry. If the user inadvertently dials an area code along with a seven digit number, the circuitry disregards the area code, only accepts the last seven digits of the number, and utilizes the area code entered in the circuitry by Procedure 23A. If code  is dialed and a four digit number is entered into the circuitry, i.e., if some numeral plus the desired area code is dialed into the circuitry the circuitry will automatically electronically dial the four digit number prior to each seven digit number entered in the circuitry and transmitted over telephone line 100. The user can erase a repeating area code entered by Procedure 23A and enter a new area code by dialing  and then dialing the new area code. Whenever an area code is entered by dialing  and dialing the area code into the circuitry, the circuitry utilizes the new area code in connection with all seven digit calls made after the call during which the  code is entered and the new area code dialed.

28. Procedure 23B: Cancellation of Repeating Area Code. This procedure cancels the repeating area code feature entered by Procedure 23A. The repeating area code entered by Procedure 23A is canceled by dialing code *#*. After *#* is dialed, light 28 flashes twice. Light 30 goes out while light 28 is flashing twice. After light 28 flashes twice light 30 illuminates. When light 28 flashes twice, the circuitry has erased the repeating area code entered by Procedure 23A and will electronically process telephone numbers only as they are dialed into the circuitry.

As would be appreciated by those of skill in the art the foregoing and other procedures could be readily programmed in the circuitry of the apparatus of FIG. 1 in a wide variety of ways utilizing readily available computer hardware and software technology.

In operation, a user begins his work shift by lifting handset 11 from the cradle, placing speaker 13 adjacent an ear, turning knob 32 to the left, dialing * to activate the circuitry, and, by dialing telephone numbers into circuitry memory in the manner prescribed in Procedure 8. As soon as the user dials the first number into circuitry memory the circuitry automatically electronically transmits the number over line 100. The user continues to dial numbers into memory while the first number rings, is going through or receives a busy signal or while he is speaking with his first caller. As sooon as the first call is completed, the circuitry determines that the telephone line 100 is "not in use" and causes another telephone number from memory to be automatically electronically dialed 77. This procedure continues until the user exhausts the supply of telephone numbers stored in circuitry memory, or, until he, with various procedures earlier described, interrupts the automatic dialing features of the circuitry.

It is presently anticipated that after a number stored in circuitry memory has been transmitted over line 100 it is erased from memory to provide storage space for numbers to be subsequently entered in circuitry memory. If desired, the circuitry can be designed to retain in circuitry memory numbers which were dialed over line 100 and which were not answered or received a busy signal.

The throats of dial tone buttons 26, 27 are square. The tops of the buttons 26, 27 are concave and are generally shaped like buttons 14–25.

Having described my invention in such terms as to enable those skilled in the art to understand and practice it, and having identified the presently preferred embodiments thereof, I claim:

1. In combination with an existing telephone line, telephone appaatus comprising
   (a) means for connecting said apparatus to said existing telephone lines;
   (b) means for receiving the voice of a first individual utilizing said apparatus and for transmitting said voice over said telephone line;
   (c) a speaker for broadcasting the voice of a second individual, said voice of said second individual being carried to said telephone apparatus by said telephone line;
   (d) memory means for storing a telephone number;
   (e) dialing means for entering telephone numbers in said telephone apparatus, telephone numbers entered on said dialing means normally being transmitted by said apparatus through said telephone line;
   (f) circuitry means for
      (i) causing a telephone number entered on said dialing means to be directed to and stored in said memory means when said first individual is utilizing said speaker and receiving means to communicate with said second individual over said telephone line,
      (ii) detecting when said individuals have completed their conversation, and,
      (iii) on detecting when said individuals have completed their conversation, automatically electronically dialing over said telephone line a telephone number stored in said memory means.

* * * * *